US009742211B2

(12) United States Patent
Stevens et al.

(10) Patent No.: US 9,742,211 B2
(45) Date of Patent: Aug. 22, 2017

(54) CHARGE CONTROL OF A METAL-AIR BATTERY

(71) Applicant: ELECTRICITE DE FRANCE, Paris (FR)

(72) Inventors: Philippe Stevens, Noisy Rudignon (FR); Julien Lhermenault, Paris (FR); Gwenaelle Toussaint, Nemours (FR)

(73) Assignee: Electricite de France, Paris (FR)

( * ) Notice: Subject to any disclaimer, the term of this patent is extended or adjusted under 35 U.S.C. 154(b) by 0 days.

(21) Appl. No.: 15/328,156

(22) PCT Filed: Jul. 22, 2015

(86) PCT No.: PCT/FR2015/052015
§ 371 (c)(1),
(2) Date: Jan. 23, 2017

(87) PCT Pub. No.: WO2016/012717
PCT Pub. Date: Jan. 28, 2016

(65) Prior Publication Data
US 2017/0214265 A1 Jul. 27, 2017

(30) Foreign Application Priority Data
Jul. 23, 2014 (FR) ...................................... 14 57126

(51) Int. Cl.
H02J 7/00 (2006.01)
H02J 7/06 (2006.01)
(Continued)

(52) U.S. Cl.
CPC ........... *H02J 7/0068* (2013.01); *H01M 10/44* (2013.01); *H01M 12/08* (2013.01); *H02J 7/007* (2013.01)

(58) Field of Classification Search
CPC ...... H01M 10/44; H01M 12/06; H01M 12/08; H01M 12/085; H02J 7/0068; H02J 7/00742
(Continued)

(56) References Cited

U.S. PATENT DOCUMENTS 3,532,548 A 10/1970 Strachurski
2015/0303530 A1* 10/2015 Toussaint .............. H01M 10/44
320/134

FOREIGN PATENT DOCUMENTS

FR 2 998 718 A1 5/2014
FR 2998718 A1 * 5/2014 ............ H01M 10/44
(Continued)

OTHER PUBLICATIONS

Neburchilov et al., "A review on air cathodes for zinc-air fuel cells," Journal of Power Sources, 2010, vol. 195, pp. 1271-1291.
(Continued)

Primary Examiner — Richard Isla Rodas
Assistant Examiner — David V Henze-Gongola
(74) Attorney, Agent, or Firm — Drinker Biddle & Reath LLP

(57) ABSTRACT

A method for managing the charge of a metal-air battery comprising at least one cell. The cell comprises a negative electrode, a first positive air electrode and a second positive oxygen-release electrode. For each cell, during the application of a charge current circulating in the cell between the negative electrode and the second positive oxygen-release electrode, the absolute value of a potential of the negative electrode is compared with a critical threshold value, the potential of the negative electrode being determined relative to the first positive air electrode. When the absolute value of the potential of the negative electrode reaches the threshold value, a surplus charging current, depending on the differ-
(Continued)

ence between the current applied to the cell and the charging current, is diverted.

15 Claims, 7 Drawing Sheets

(51) Int. Cl.
  *H02J 7/24* (2006.01)
  *H01M 12/08* (2006.01)
  *H01M 10/44* (2006.01)
(58) Field of Classification Search
  USPC .................. 429/402–407; 320/128, 134, 164
  See application file for complete search history.

(56) References Cited

FOREIGN PATENT DOCUMENTS

| | | | |
|---|---|---|---|
| FR | WO 2014083268 A1 * | 6/2014 | ............ H01M 10/44 |
| JP | 2001-511638 A | 8/2001 | |
| JP | 2012-249345 A | 12/2012 | |
| JP | 2013-505544 A | 2/2013 | |
| WO | 99/05767 A1 | 2/1999 | |
| WO | 2011/035176 A1 | 3/2011 | |
| WO | 2014/009211 A1 | 1/2014 | |
| WO | 2014/083268 A1 | 6/2014 | |

OTHER PUBLICATIONS

English language translation of Office Action issued in related application JP 2017-503516, dated May 22, 2017, 6 pages.

* cited by examiner

CHARGE CONTROL OF A METAL-AIR BATTERY

CROSS-REFERENCE TO RELATED APPLICATIONS

This application is the U.S. national phase of the International Patent Application No. PCT/FR2015/052015 filed Jul. 22, 2015, which claims the benefit of French Application No. 14 57126 filed Jul. 23, 2014, the entire content of which is incorporated herein by reference.

TECHNICAL FIELD

The invention relates to the field of charge control of a metal-air battery comprising metal-air cells having three electrodes.

BACKGROUND

The cells of metal-air batteries utilize a negative electrode based on a metal such as zinc, iron, or lithium, coupled to an air electrode. The electrolyte most commonly used is an aqueous alkaline electrolyte.

During discharge of such a battery, oxygen is reduced at the positive electrode and the metal is oxidized at the negative electrode:

Discharge at the negative electrode: $M \rightarrow M^{n+} + n\ e^-$

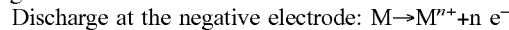
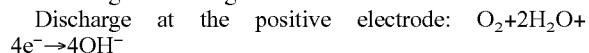

Discharge at the positive electrode: $O_2 + 2H_2O + 4e^- \rightarrow 4OH^-$

The advantage of metal-air systems lies in the use of a positive electrode of infinite capacity, as the oxygen consumed at the positive electrode does not need to be stored in the electrode but can be collected from the ambient air. Metal-air type electrochemical generators are therefore known for their high specific energies, which can reach hundreds of Wh/kg.

Air electrodes are used in alkaline fuel cells for example, which are particularly advantageous over other systems because of the favorable reaction kinetics at the electrodes and because of the absence of noble metals such as platinum. Metal-air batteries are also used in hearing aids for example.

An air electrode is a porous solid structure, usually of carbon particles, in contact with the liquid electrolyte. The interface between the air electrode and the liquid electrolyte is a so-called "triple contact" interface where the active solid material of the electrode, the gaseous oxidant, that is to say the air, and the liquid electrolyte are present simultaneously. A description of different types of air electrodes for zinc-air batteries is described for example in the article by Neburchilov V. et al, entitled "A review on air cathodes for zinc-air fuel cells," *Journal of Power Sources* 195 (2010) p. 1271-1291.

When a metal-air battery is to be recharged electrically, the direction of current is reversed. Oxygen is produced at the positive electrode and the metal is redeposited by reduction at the negative electrode:

Recharge at the negative electrode: $M^{n+} + n\ e^- \rightarrow M$

Recharge at the positive electrode: $4\ OH^- \rightarrow O_2 + 2H_2O + 4\ e^-$

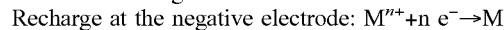
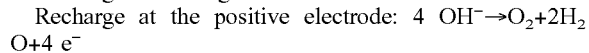

Metal-air batteries work very well when discharging, but multiple problems remain unsolved when charging.

There are many disadvantages to using an air electrode in the recharging direction to carry out an oxidation reaction with oxygen release. The porous structure of the air electrode is fragile. It has been observed that this structure is mechanically destroyed by the release of gas when it is used to produce oxygen by oxidation of a liquid electrolyte. The hydraulic pressure generated in the electrode by the gas production is sufficient to break the binding between the carbon particles that compose the air electrode.

The degradation of the air electrode when it is used to charge or recharge the metal-air battery greatly reduces the life of the battery. This is one of the main causes of the limited commercial development of electrically rechargeable metal-air batteries.

One means of protecting the air electrode against degradation is to use a second positive electrode referred to as a second "charging" electrode, which is used for the oxygen release reaction.

The air electrode is then decoupled from the charging electrode and only the latter is used during the charging phase. The air electrode remains inert during the charging phase and retains a fixed potential. U.S. Pat. No. 3,532,548 of Z. Starchurski describes an example of a zinc-air battery with a second auxiliary electrode used for the charging phase.

Problems may also arise at the negative electrode during the recharging of a metal-air battery, for example a zinc-air battery.

When charging, the metal ions $M^{n+}$ are reduced at the negative electrode and are deposited in their metal form M as soon as the potential at this electrode is sufficiently negative. A uniform and homogeneous deposition of metal on the electrode is desired to ensure good performance during the charging and discharging cycles of this electrode.

However, it was found that under certain conditions, the metal could be deposited as a foam with poor adherence to the surface of the electrode and could thus detach from the electrode, causing a loss of active material and therefore a loss of battery capacity. In other cases, it was found that the metal could be deposited in the form of irregular growths called dendrites. These dendrites can grow to reach the positive electrode during charging, causing an internal short-circuit that prevents charging.

In an attempt to solve these problems and produce a homogeneous zinc deposit during the charging phase, patent WO 2014 083268 A1 proposes maintaining the potential of the negative electrode below a critical threshold. This potential is obtained by measuring the voltage between the air electrode, at a fixed potential during charging, and the negative electrode.

The above considerations relate to a single metal-air cell. However, batteries are usually composed of a plurality of cells connected to one another in series, in parallel, or in a combination of serial and parallel connections. The charging of such a battery makes use of a single charger supplying the battery with direct current. The charger is connected to both terminals of the battery, respectively corresponding to the negative electrode of a cell located at one end of the battery and the charging positive electrode of the cell located at the other end of the battery.

When charging a battery of cells connected in series, the total current flowing through the battery remains constant even if the cells are not individually in the same charge state. The cells may also be at different voltages. The release of oxygen at the anode of a metal-air cell results in large fluctuations in voltage between the two charging electrodes of the cell. Indeed, unlike the case of a closed battery in which the positive and negative electrodes can both be charged and are therefore both at stable potentials, the charging positive electrode of a metal-air cell is not in equilibrium with the active material, as there is a release of oxygen to the outside.

Large voltage fluctuations in a metal-air cell can intensify irregularities in the deposition of metal on the negative electrodes of the cells of such a battery.

Charge control devices for conventional two-electrode batteries allow distributing the charging current in the battery cells to ensure that all cells are fully charged. These charge control devices monitor the voltage at the terminals of a cell in order to identify where the cell lies on a previously obtained current-voltage charge curve. Charging is stopped when the voltage at the cell terminals exceeds a characteristic charging end point. These charge control devices are not suited for a battery of metal-air cells in which voltage fluctuations render inaccurate the charge state data of a cell, and where it is important to be careful not to exceed a threshold potential at the negative electrode as described above.

The above constraints make it very difficult to provide effective control of a battery composed of metal-air cells in order to increase the number of charging and discharging cycles of the battery, and thus advantageously give the battery a longer life. There is therefore a need for a charge control method for a battery composed of metal-air cells, and for a charge manager for such a battery.

SUMMARY

To address the problems described above, the present invention provides a method for managing the charge of a metal-air battery comprising at least one cell, the cell comprising at least a negative electrode, a first positive air electrode, and a second positive oxygen-release electrode, the method comprising, for each cell, during application of a current to the cell that results, during charging, in the flow of charging current between the negative electrode and second positive oxygen-release electrode:

comparing the absolute value of a potential of the negative electrode to a critical threshold value, the potential of the negative electrode being determined relative to the first positive air electrode;

when the absolute value of the potential of the negative electrode reaches the threshold value, diverting an excess charging current that is a function of the difference between the current applied to the cell and the charging current.

The invention provides a charge control method for a metal-air battery, adapted to the constraints of these cells and usable with cells comprising a second charging electrode.

The invention compares the potential of the negative electrode of each metal-air cell to a reference voltage for this cell. This approach differs from the prior art where the parameter monitored in order to determine the charge state of a battery cell is the voltage between the charging electrodes.

The invention has the advantage of maintaining the potential of the negative electrode below the threshold value under all circumstances. This effect is achieved by diverting the portion of the charging current which otherwise would increase the potential of the negative electrode above the threshold value. The current applied to the cell, from the battery, then follows two parallel paths: a portion of the current continues to power the cell and passes through the electrolyte, while the excess portion is redirected for example to at least one other cell of the battery. Using the general terminology presented above, when the absolute value of the potential of the negative electrode reaches the aforementioned threshold value, the excess charging current is diverted from the negative electrode of this cell, said excess charging current being a function of the difference between the current applied to the cell and the charging current.

Using the electric potential of the negative electrode as the parameter for monitoring the battery charge state, instead of the voltage between the charging electrodes, eliminates the voltage instability constraints of metal-air cells which are the source of the difficulties in designing an effective control system for batteries using such cells.

The potential of the first positive air electrode is stable in the charging phase and can thus serve as a reference electrode for measuring the changing potential of the negative electrode. The voltage between the negative electrode and the first positive air electrode thus gives access to the potential of the negative electrode. By measuring the potential of the negative electrode, the invention eliminates the high fluctuations in potential occurring at the positive charging electrode which typically originate from the oxygen release reaction as explained above. The invention thus makes it possible to avoid undesirable deterioration of a cell during charging, while maintaining the potential of the negative electrode below a threshold value also referred to as a reference value.

The potential of the negative electrode measured in the cell is also not dependent on the states of the neighboring cells to which the cell is connected. The charge control method of the invention is thus not dependent on the number of cells in a battery. The method can be implemented for each cell independently of the state of the neighboring cells.

The charge control method of the invention thus allows accurately identifying when the potential exceeds a critical threshold value for the potential, and preventing the formation of foam or dendrites on the negative electrode which could damage a cell and reduce the service life of a battery.

The charge control devices used in standard two-electrode batteries generally have the disadvantage of operating as an "all-or-nothing" system. Generally, all the current is diverted when the charge manager determines that the cell has been recharged by comparing the voltage at its terminals to a reference voltage characteristic of completed charging. By only redirecting the excess charging current that would produce an unwanted rise in potential of the negative electrode, the invention allows continuing the charging of a metal-air cell even when the potential of the negative electrode has reached the threshold value.

In an advantageous embodiment, the excess charging current of a cell can be diverted to a neighboring cell or to a charger.

The term "neighboring cell" refers to the first neighbor of the cell concerned. A distribution of excess current from one cell to the next has been found suitable for managing the distribution of charging current in a battery containing a large number of cells.

Typically, the excess charging current of a cell can be diverted to a neighboring cell. The excess charging current can also be diverted to a charger of the battery, for example for a cell in which the second positive oxygen-release electrode is connected to the positive terminal of the battery charger.

The diverting of the excess charging current, occurring when the critical threshold value of the potential of the negative electrode is reached, can be used in a neighboring cell that may be in a different charge state.

Advantageously, for each cell, the critical threshold value can be set based on the potential when charging begins.

During charging, there is competition on the negative electrode between a reduction of zincate ions to produce zinc and a reduction of water to produce hydrogen. The probability of occurrence of the second hydrogen production reaction increases as the potential of the negative electrode increases, becoming more negative. By capping the reduction potential based on the potential when charging begins, the risk of a hydrogen production reaction occurring and damaging the cell can be reduced. It is possible to set the threshold value for the potential not to be exceeded on the negative electrode as a value corresponding to the potential of the negative electrode when charging begins plus an increase for example of 10%.

According to one embodiment, the critical threshold value may be re-evaluated at regular time intervals.

After typically one hundred charge and discharge cycles, the charge current-voltage properties of a metal-air battery cell may change, despite all the precautions taken to preserve it. It is therefore wise to take this into account by adjusting the threshold value for the potential at regular time intervals, using the method described above. Such an evaluation may be carried out, for example, after a given number of charge and discharge cycles, to account for progressive degradation of the cell.

According to one particular embodiment, an analog circuit comprising a component of variable impedance may be provided, the diverting of excess charging current being implemented by modifying the impedance of said component.

To divert the excess charging current when the potential of the negative electrode reaches the threshold value for the potential, the use of an analog component whose impedance can be modified as a function of the voltage being applied to it, allows quickly diverting the excess charging current. Such a diversion mechanism, which may for example be based on the use of a power transistor such as a Darlington transistor, can be quite suitable for metal-air cells.

In particular, the impedance of the component may vary at least as a function of a quantity representative of a difference between the potential of the negative electrode and said threshold value, delivering said excess charging current as output from the component.

The use of a difference between the potential of the negative electrode and the threshold value as the means for regulating the activation of the analog component in order to divert the excess charging current provides a means adapted for protecting the cell from possible deterioration. All of the current applied to the cell then passes into the cell when charging begins, when the potential of the negative electrode is less than the threshold value, and once the threshold value is reached the excess current, equal to the difference between the current applied to the cell and the current passing through the cell, is diverted to another cell.

According to one embodiment, the measurement of the potential of the negative electrode may comprise voltage stabilization filtering between the negative electrode and the first air electrode.

The charging dynamics of a metal-air cell may result in movements of the charge carriers in the electrolyte, generating noise rendering the measurement of the potential of the negative electrode of a cell sensitive to this noise. Variations in the current and voltage may be caused by noise, and can interfere with the charge control of a metal-air cell. Filtering the voltage measured between the cathode and the air electrode, for example by an operational amplifier in a differential architecture, cuts the high-frequency voltage variations. Thus, the measured potential of the negative electrode is not subject to rapid fluctuations likely to introduce control bias during charge control of the battery.

The invention also relates to a charge manager for a cell of a metal-air battery comprising at least one cell, the cell comprising at least a negative electrode, a first positive air electrode, and a second positive oxygen-release electrode, the charge manager comprising an electronic circuit for each cell, arranged so as to, during application of a current to the cell that results, during charging, in the flow of charging current between the negative electrode and the second positive oxygen-release electrode:

comparing the absolute value of a potential of the negative electrode to a critical threshold value, the potential of the negative electrode being determined relative to the first positive air electrode;

when the absolute value of the potential of the negative electrode reaches the threshold value, diverting an excess charging current that is a function of the difference between the current applied to the cell and the charging current.

The component elements of such a charge manager allow an effective implementation of the method described above. In particular, by not using a voltage between the two charging electrodes, but instead the potential of the negative electrode and comparing this potential to a critical threshold value, the invention effectively protects a cell from the damage that can be caused by high potentials at the negative electrode. The invention thus solves the problem occurring in metal-air cells of significant voltage fluctuations between charging electrodes as explained above.

The electronic circuit controls the charging of the cell by diverting the excess charging current corresponding to the current which would increase the potential of the electrode above the threshold value. This diverting of the excess charging current effectively occurs when the potential of the negative electrode reaches the threshold value.

The charge manager of the invention thus allows controlling the charge state of each cell while protecting them and guaranteeing a long service life, regardless of the charge state and/or the potential of other cells of the battery.

In particular, the analog circuit can divert the excess charging current to a neighboring cell or to a charger, via a respective connection to said neighboring cell or charger.

According to one embodiment, the analog circuit for diverting the excess charging current may comprise a component of variable impedance, the diverting of the excess charging current being implemented by changing the impedance of said component.

In particular, the component of variable impedance is a power transistor.

The use of a power transistor provides fast response time for diverting the excess current. In addition, it requires little energy to control such an analog component in order to divert strong currents on the order of 3 amperes within several hundred microseconds.

In particular, the power transistor may be a Darlington transistor.

The Darlington transistor may be used as a component suitable for diverting strong currents of several amperes when controlled by a command that requires low currents of a few mA. It can also satisfy the response time requirements for diverting current from metal-air cells when the potential of the negative electrode approaches the threshold value and more particularly when this potential reaches the threshold value.

According to one embodiment, the charge manager may further comprise an electronic circuit for measuring the difference in potential between the negative electrode and the first positive air electrode.

According to one embodiment, the electronic measurement circuit may comprise a voltage stabilization filter.

The charging dynamics of a metal-air cell may result in movements of the charge carriers in the electrolyte, generating noise and rendering the measurement of the potential of the negative electrode of a cell sensitive to this noise. These may be rapid fluctuations, typically exceeding 75 Hz, in the voltage across the charging electrodes. For noise reduction, the invention may for example use a measurement based on a differential amplifier employing an operational amplifier acting as a low-pass filter. In this manner, the measurement of the potential of the negative electrode is not contaminated by biases related to high-frequency noise, which in this context are frequencies typically above 75 Hz.

The invention also relates to a battery comprising at least one cell, each cell comprising at least a negative electrode, a first positive air electrode, a second positive oxygen-release electrode, and a charge manager as described above.

BRIEF DESCRIPTION OF THE DRAWINGS

The method of the invention will be better understood from reading the following description of some exemplary embodiments presented for illustrative purposes and in no way limiting, and from observing the accompanying drawings in which.

For reasons of clarity, the dimensions of the various elements represented in these figures are not necessarily in proportion to their actual dimensions. In the figures, identical references correspond to identical elements.

DETAILED DESCRIPTION

The invention relates to the charging of a battery composed of metal-air cells connected in series, in parallel, or in a combination of serial and parallel connections.

Figure 1:
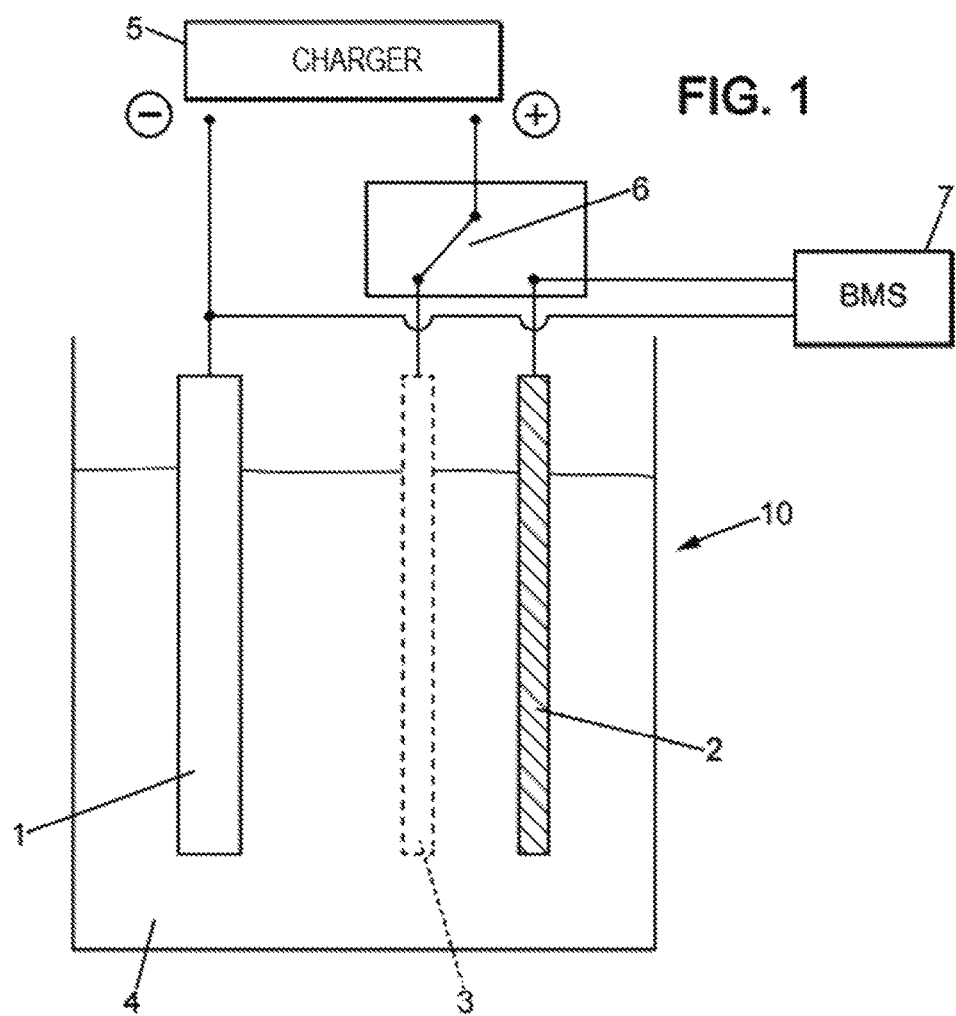
FIG. 1 is a schematic representation of a metal-air cell with three electrodes.

The most successful and effective metal-air cells in terms of service life are three-electrode cells such as the one represented in FIG. 1. FIG. 1 schematically illustrates a battery composed of a single metal-air cell 10. Such a cell 10 comprises an electrolyte 4, typically formed from an alkaline solution. The negative electrode 1, typically of a metal such as zinc, iron, or lithium, is connected to a negative terminal of a charger 5. A first positive air electrode 2 is used in the power circuit when discharging. When charging, the first positive air electrode 2 is used only for measuring the potential of the negative electrode 1. The mode of operation, charging or discharging, may be selected by a switching means 6 such as a relay. A second positive oxygen-release electrode 3 is used only when charging the battery. The cell assembly is controlled when charging by means of a charge manager 7 called a Battery Management System or BMS.

Because of the large voltage fluctuations that occur between the charging terminals 1 and 3, the charge managers used in conventional two-electrode batteries are not suitable for batteries comprising metal-air cells. It is also advantageous to maintain the potential of the negative electrode below a threshold value to avoid the formation of dendrites or foam during deposition of metal ions on the electrode during the charging phase.

When a battery comprising a plurality of cells is charged, a direct current delivered by the charger 5 passes through all cells of the battery regardless of the potential of each cell. The charging kinetics may vary from one cell to another, and large disparities in the potential of the negative electrodes of each cell may therefore occur when charging a battery and the critical threshold value of the potential may be exceeded in some cells, contributing to battery deterioration.

Figure 2:
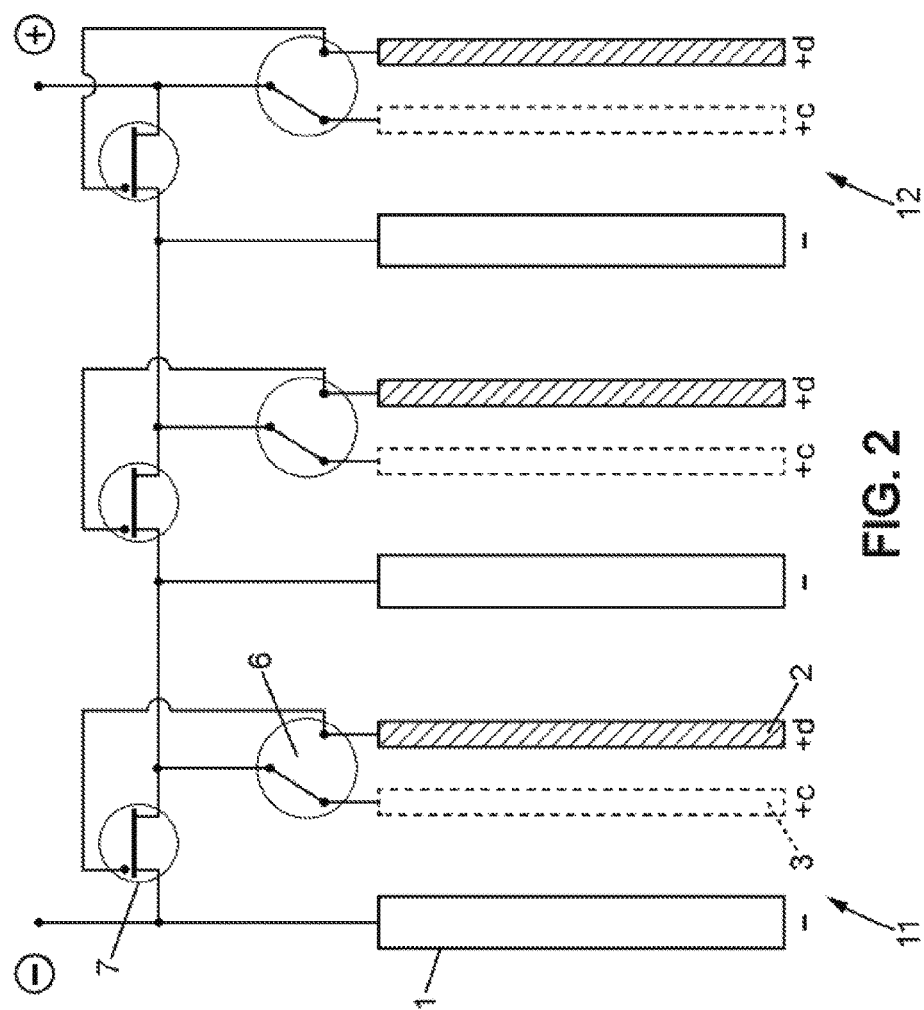
FIG. 2 is a schematic representation of a battery composed of three metal-air cells connected in series and comprising a member for diverting excess charging current.

FIG. 2 schematically illustrates a battery comprising three metal-air cells connected in series, each equipped with a charge manager 7 of the invention. The charging current delivered by a charger flows between the negative terminal connected to the negative electrode 1 of a cell 11 located at one end of the battery and the positive terminal of the second oxygen-release electrode 3 of a cell 12 located at the other end of the battery. The invention associates a charge manager 7 with each cell of the battery, adapted to receive a measurement of the value of the potential of the negative electrode of the cell 1, compare this value to a threshold value corresponding to a reference value not to be exceeded, and actuate a member for diverting excess charging current when the threshold value is reached.

The excess charging current can be defined as a current equal to the difference between the current applied to the cell, also called the cell input current, and the current actually passing through the cell via the electrolyte, from the negative electrode to the second positive oxygen-release electrode.

Figure 3:
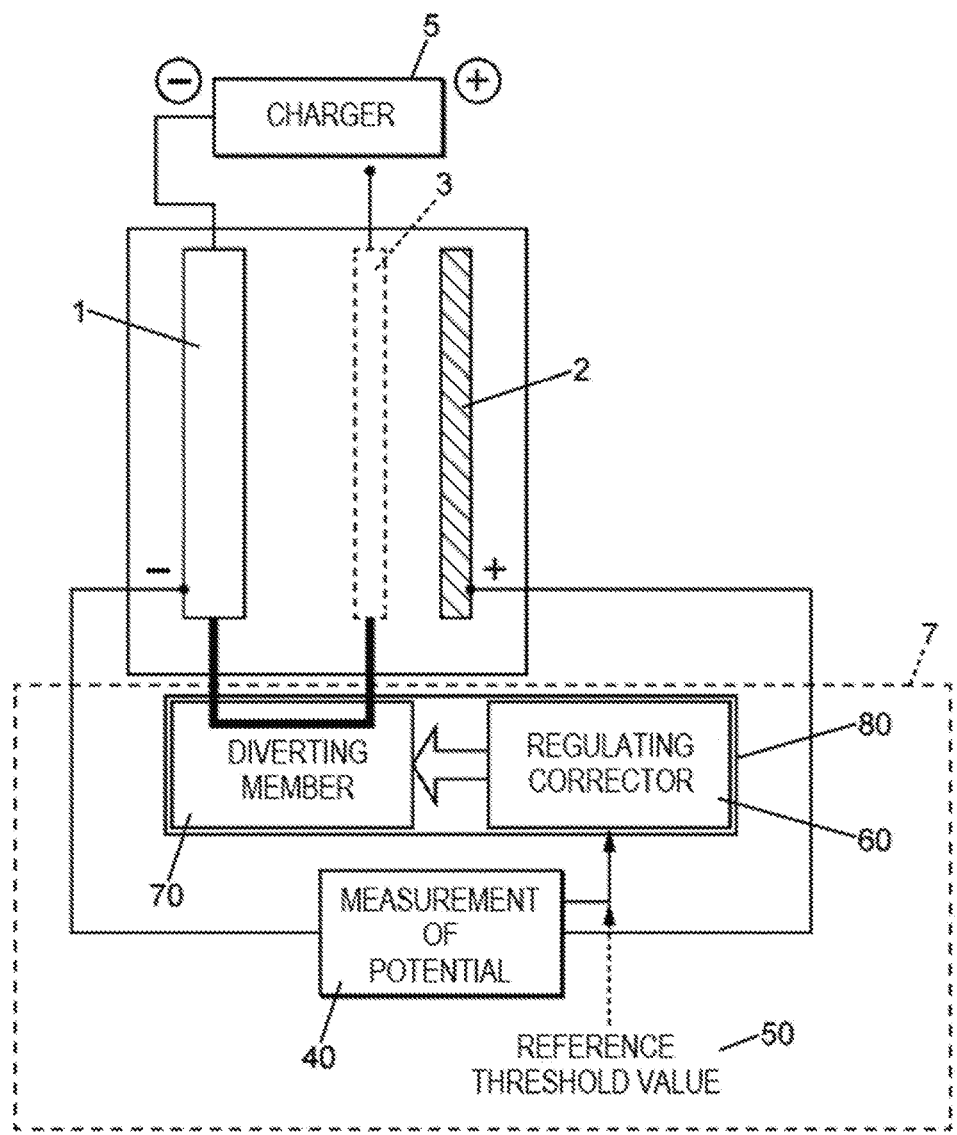
FIG. 3 is a schematic representation of a charge manager for a metal-air cell with three electrodes.

FIG. 3 schematically illustrates the main components that may be included in a charge manager 7 of the invention. For reasons of clarity, this figure illustrates a single cell supplied by a charger 5.

The charge manager 7 comprises an electronic circuit 40 for measuring the potential of the negative electrode 1 via a measurement of the difference in potential between the first positive air electrode 2 and the negative electrode 1. The value measured by the circuit 40 may be transmitted to a regulating electronic circuit 80. This circuit 80 may also receive a reference threshold value 50 which may be a fixed value or a value reevaluated after a given number of charging and discharging cycles. The circuit 80 may comprise a first electronic unit acting as a regulating corrector 60, which compares the values of the measured potential to the reference threshold value 50 for the purposes of controlling a second electronic unit forming a member 70 for diverting charging current.

The charge manager 7 of the invention is further distinguished from prior art charge management devices in that it provides analog control of the diverting of excess charging current, not binary control. Thus, the amount of diverted charging current can be such that a portion of the current still passes through the cell when the potential of the negative electrode reaches the reference value 50. However, such diversion may only truly take effect when the threshold value is reached.

It should be noted that charging a cell is a non-linear process. Thus, at the beginning of a charge cycle, the current traveling through the cell may be high and the potential of the negative electrode 1 may be below the threshold value 50. The potential of the negative electrode 1 increases as metal ions are reduced on the negative electrode 1. However, the charger supplies the cells with a constant current. The invention allows maintaining a constant current through the cell in a first phase of charging the battery, while maintaining the potential of the negative electrode below the threshold 50. When the potential of the negative electrode 1 reaches the threshold value, the excess current is diverted to another cell. The remaining portion of current allows completing the charging of the battery without damaging the cell. It is common to end the charging of a battery when a certain amount of current has been supplied to the battery. As the invention allows redistributing the excess charging current to cells within the battery that can still use some or all of the current from the charger 5, it is possible to end the charging according to the total current delivered by the charger, based on a value predetermined as corresponding to an amount of current that would fully charge all cells of the battery.

FIGS. 4 to 8 illustrate electronic circuits for one particular exemplary embodiment of components 40, 80, 60 and 70 described above. Alternative embodiments based on other technical means for fulfilling the functions of measurement, comparison of a potential to a reference value, and management of a diverting member, may be used to implement the charge control method described above.

Figure 4:
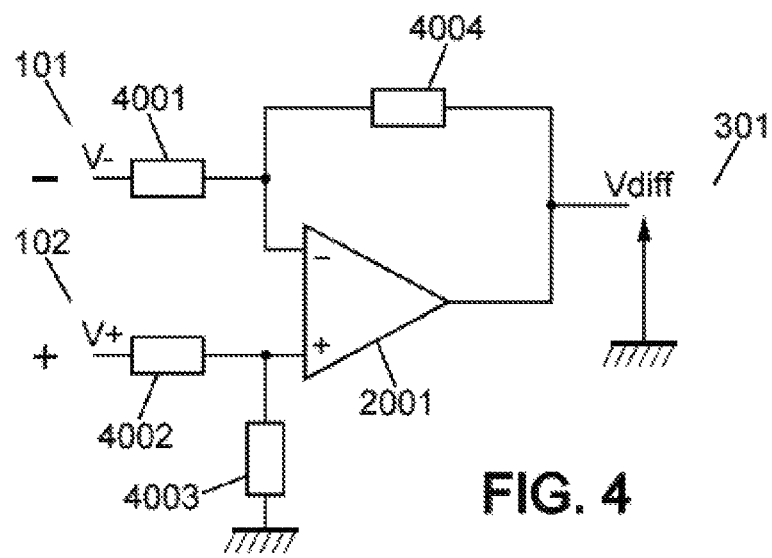
FIG. 4 is a circuit diagram of a circuit for measuring the potential of the negative electrode of a metal-air cell.

FIG. 4 represents an example of an electronic circuit 40 for measuring the potential of the negative electrode 1. This circuit 40 consists of a differential amplifier 2001 which may be selected so that it is operational within voltage ranges generally falling between 0 V and 6 V. The value of this voltage range generally depends on the number of cells comprised in the battery. The negative terminal of the amplifier 2001 may be connected to the negative electrode 1 via a resistor 4001. The potential 101 of this electrode is denoted V−. The positive terminal may be connected to the second positive oxygen-release electrode 2 via a resistor 4002. A resistor 4003 connected to ground may be interposed between resistor 4002 and the amplifier 2001. The potential 102 of this electrode is denoted V+. The amplifier may comprise a feedback resistor 4004. At the output of the circuit 40, a voltage 301 denoted Vdiff, corresponding to the potential of the negative electrode 1, can be obtained.

The use of an operational amplifier for measuring a voltage may be particularly advantageous in the context of a metal-air cell, due to the low voltages and currents involved. Indeed, the use of an operational amplifier allows obtaining measurements with very little disruption of the electrical state of the measurement electrodes 1 and 2. Furthermore, the operational amplifier can act as a low-pass filter, which eliminates voltage fluctuations that could introduce control bias. As an alternative, it is possible to use a low-pass filter upstream or downstream of the potential measurement assembly.

In one particular embodiment, the resistors 4001-4004 may be chosen to be equal to 2.2 kOhm and the operational amplifier may be chosen to be a LT1001A® amplifier. This type of assembly allows currents of 1.4 mA on the line tied to V−, with power dissipation of 4.2 mW, and currents of 0.7 mA on the line tied to V+, with power dissipation of 1.1 mW. These values may be subject to small variations due to interconnections between the various circuits of FIGS. 4 to 8.

Figure 5A:
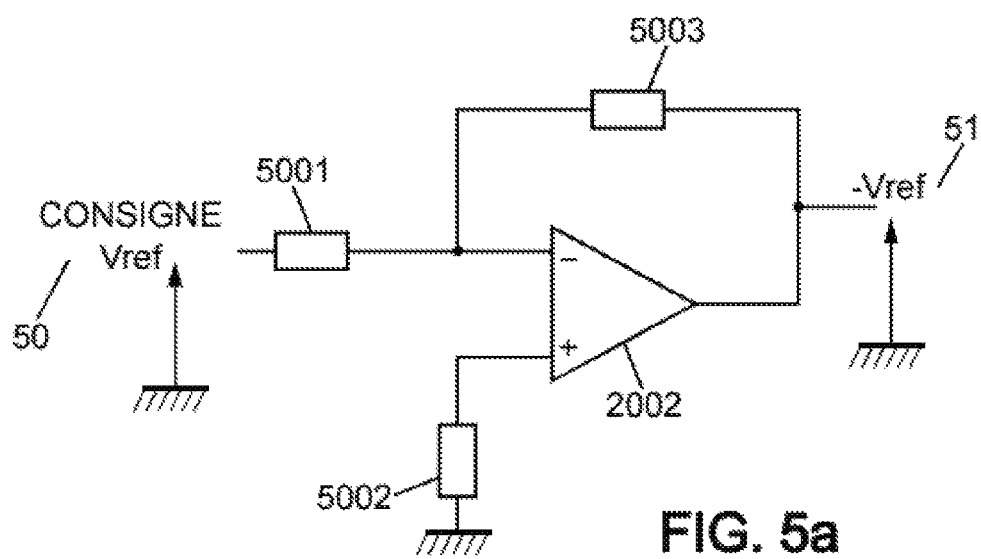
FIGS. 5a and 5b are circuit diagrams of a circuit for estimating a difference corresponding to the difference between a reference threshold potential and the measured potential of the negative electrode.
Figure 5B:
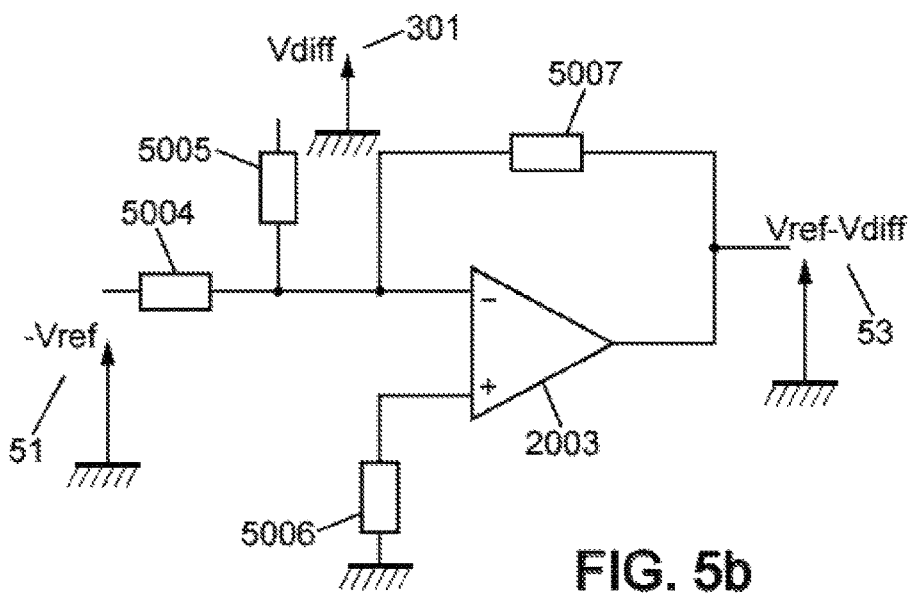

The voltage 301 can then be routed to the regulating corrector 60 for comparison to a reference value as shown in FIG. 5b.

Figure 6:
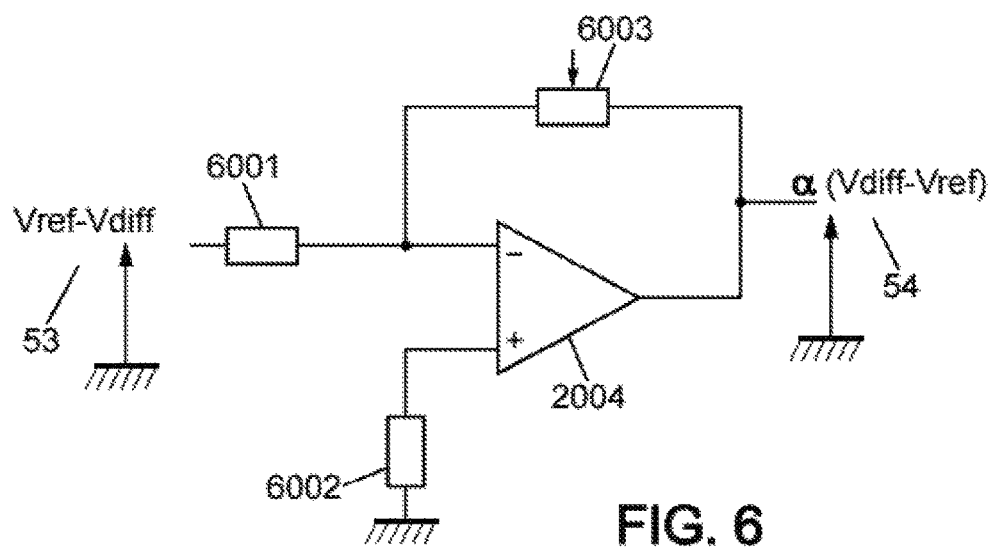
FIG. 6 is a circuit diagram of a circuit for adjusting the difference as measured according to the diagrams of FIGS. 5a and 5b.

FIGS. 5a, 5b, and 6 show an electronic circuit as an exemplary embodiment of the regulating corrector 60 of FIG. 3.

FIG. 5a proposes an inverting amplifier assembly for changing the sign of the voltage 50 corresponding to the threshold value Vref. This assembly comprises an operational amplifier 2002 in which the positive terminal may be connected to ground via a resistor 5002. The negative terminal may be connected to the reference voltage 50 via a resistor 5001. A feedback resistor 5003 may also be provided.

Resistors 5001-5003 may have a value of 2.2 kOhm for example. Amplifier 2002 may have the same characteristics as amplifier 2001. Thus, the assembly of FIG. 5a can be adapted to invert an input voltage 50 of between 1.3 V and 1.7 V. The absolute value of the output voltage 51 of the inverting amplifier may also be between 1.3 V and 1.7 V. The maximum current in the line comprising the Vref input may be 0.8 mA. The power dissipated by each resistor may be 1.4 mW.

The output 51 of the assembly of FIG. 5a is used as input to the summing-inverter assembly of FIG. 5b.

The inverting summing amplifier assembly of FIG. 5b may be provided for calculating a difference between the reference value 50 and the voltage 301 representing the potential of the negative electrode 1. The negative terminal of the inverting summing amplifier 2003 may be connected via a resistor 5004 to a line brought to voltage 51. It may also be connected via resistor 5005 to a line brought to voltage 301. The positive terminal of amplifier 2003 may be connected to ground via a resistor 5006, and amplifier 2003 may have a feedback resistor 5007. Amplifier 2003 may output a voltage 53 denoted Vref-Vdiff corresponding to the difference between the reference value 50 and the potential of the negative electrode 1 given by voltage 301.

In one specific embodiment, the resistors 5004-5007 may have a value of 2.2 kOhm, and amplifier 2003 may be identical to amplifiers 2001 and 2002. The output voltage 53 may vary between −1.7 V and 1.3 V. The maximum current in the line brought to voltage 301 may be 1.4 mA, the maximum current in the line brought to voltage 51 may be 0.8 mA, and the maximum output current may be 0.8 mA. As the output 53 is connected to the inverting amplifier assembly of FIG. 6, typically with a resistor on the input line, it is possible to estimate more accurately the maximum currents and the power dissipation of the assembly of FIG. 5b. The maximum current in the line brought to voltage 301 may be 2.1 mA, the maximum current in the line brought to voltage 51 may be 1.6 mA. The power dissipation of this assembly may be 26 mW.

The assembly of FIG. 6 corresponds to an inverting amplifier assembly that amplifies the voltage difference 53 in order to construct a control voltage for the member for diverting excess charging current. The assembly of FIG. 6 allows introducing a gain in said difference 53. This gain adjusts the value of the difference between the potential at the negative electrode and the reference value 50 beyond which a component of variable impedance 81, represented in FIG. 8, begins to divert a portion of the current applied to the cell. It is thus possible to choose a gain such that the component 81 of variable impedance, described below, is able to divert a small portion of the current applied to the cell even when the potential of the negative electrode has not reached the reference value 50.

The negative terminal of the amplifier 2004 may be connected via a resistor 6001 to a line brought to voltage 53. The positive terminal may be connected to ground via a resistor 6002. A resistance potentiometer 6003, typically adjustable between 10 kOhm and 300 kOhm, can serve as a feedback resistor. The gain of the inverting amplifier can therefore be adjustable. The input currents at the positive and negative terminals of the amplifier 2004 may typically be negligible due to the high value of the feedback resistance. The assembly of FIG. 6 may output a control voltage 54 corresponding to voltage 53 multiplied by an alpha gain. This gain is expressed in terms of resistors R6003 and R6001 as being equal to −R6003/R6001. Amplifier 2004 may be identical to amplifiers 2001-2003, resistor 6001 may have a value of 1 kOhm, and resistor 6002 may have a value of 2.2 kOhm.

The use of a potentiometer as a feedback component allows adapting the gain to the specifics of each cell as stated above. The resistance of the potentiometer may be adjusted by calibration once before use, or be recalibrated after a determined number of charge and discharge cycles.

To stabilize the input voltage 53, it is possible to add a low-pass filter upstream of resistor 6001, for example a low-pass filter having a cutoff frequency of 75 Hz. Such a filter limits voltage oscillations that would otherwise have the unwanted effect of alternately triggering and stopping the diverting of excess current at the component of variable impedance represented in FIG. 8.

Figure 7:
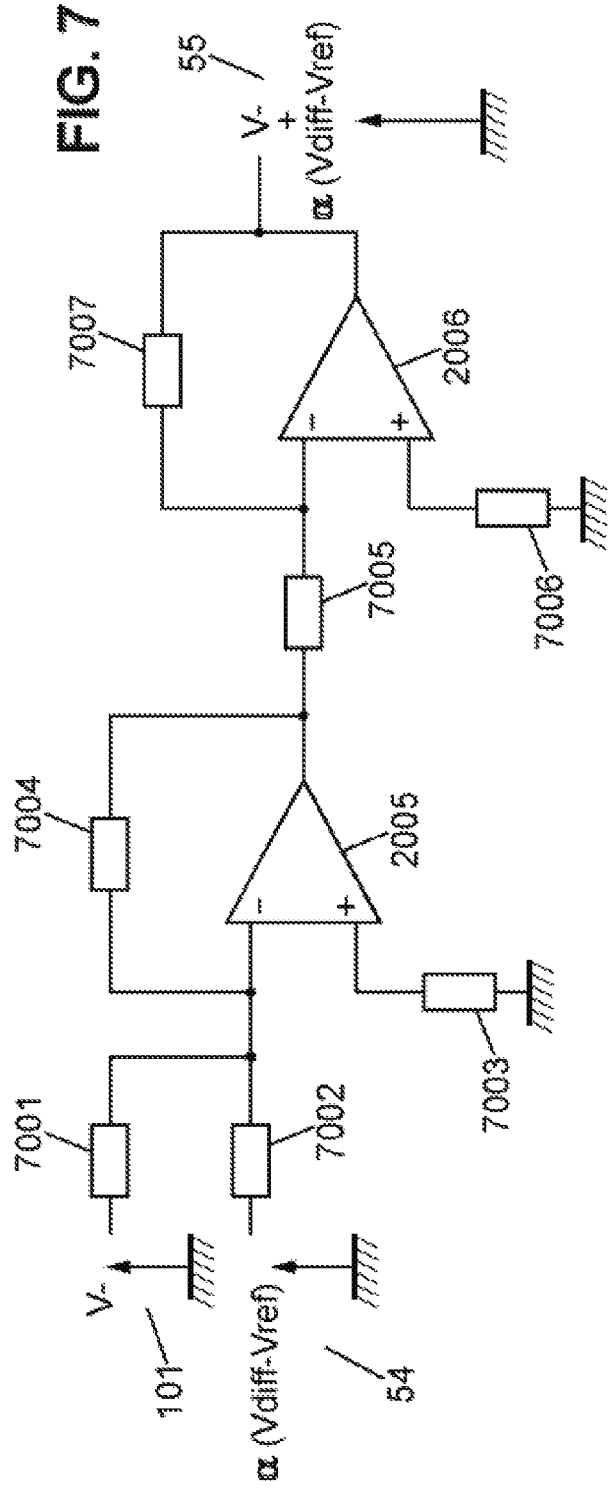
FIG. 7 is a circuit diagram of a circuit for obtaining a voltage to control a component of variable impedance in order to divert the excess charging current.

The current diverting member 70 may comprise a circuit for generating a control voltage for a component of variable impedance such as a power transistor, described below. FIG. 7 shows an arrangement in which control voltage 54 is added to the potential of the negative electrode 101 in order to generate such a control voltage. This arrangement consists of an inverting summing amplifier 2005 followed by a serially connected inverting amplifier 2006. The negative terminal of amplifier 2005 may be connected to a line brought to voltage 54 via a resistor 7002 and to a line brought to voltage 101 via a resistor 7001. The positive terminal may be connected to ground via a resistor 7003. A feedback resistor 7004 may be provided.

The output of amplifier 2005 may be connected via a resistor 7005 to the negative terminal of amplifier 2006. The positive terminal of amplifier 2006 may be connected to ground via a resistor 7006. A feedback resistor 7007 may be provided. As output from amplifier 2006, the assembly may deliver a voltage 55 corresponding to the sum of voltage 101 and voltage 54.

According to one particular embodiment, resistors 7001-7007 may have a value of 2.2 kOhm. Amplifiers 2005 and 2006 may be identical to amplifiers 2001-2004.

Voltage 54 may vary between −15 V and +15 V when the amplifiers can operate rail-to-rail; voltage 101 may typically vary between 0 and 3 V. The maximum value of voltage 55 may therefore be 15 V and the minimum voltage −15 V when the amplifiers can operate rail-to-rail, amplifier 2005 operating within these extremes at the limit of the saturation regime.

Figure 8:
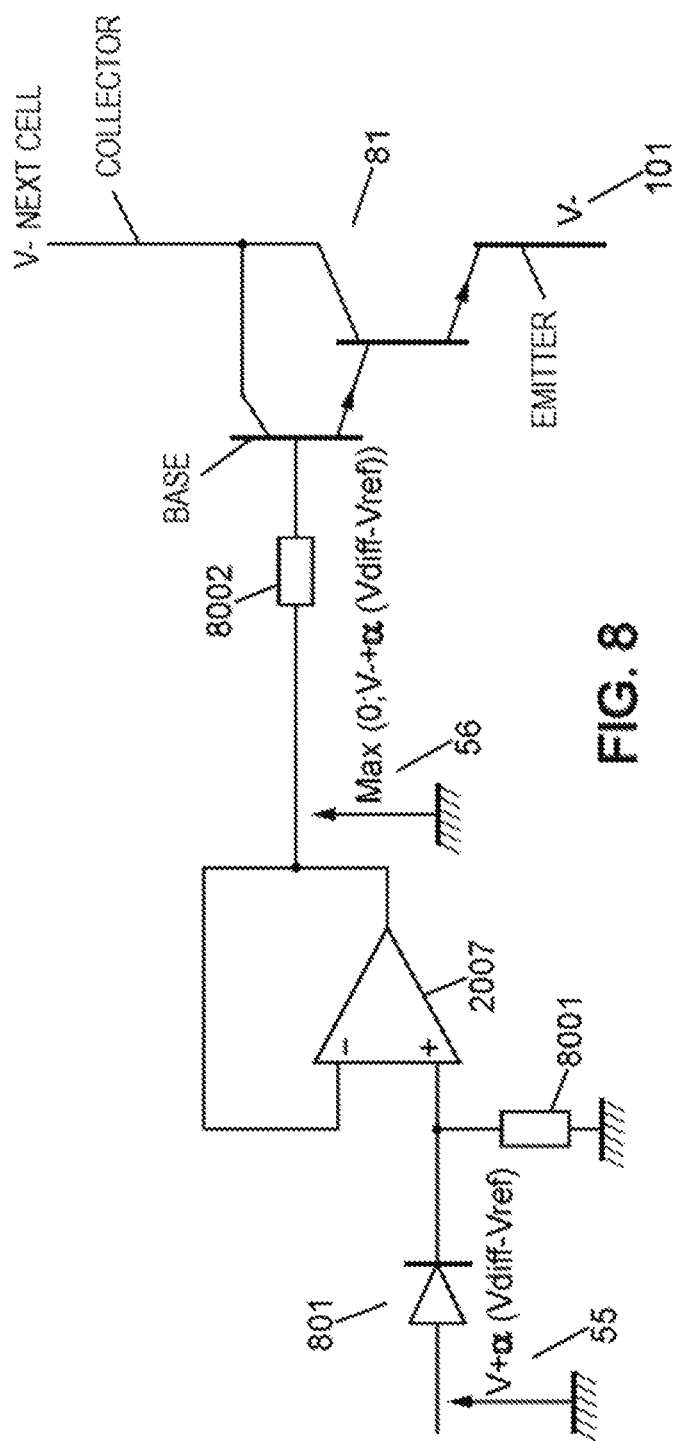
FIG. 8 is a circuit diagram of a circuit for controlling the activation of a Darlington transistor in order to divert the excess charging current to a neighboring cell.

As will be presented in relation to FIG. 8, a diode may be provided at the output of the line brought to voltage 55 and upstream of the voltage follower assembly of FIG. 8. As the diode prevents the passage of current for negative applied voltages, it is possible to estimate the current that is output from the inverting amplifier 2006. The maximum output current from 2006 may be 7 mA. With a voltage on the inverting terminal of close to 1 V, the power dissipation in amplifier 2006 may be 7 mW. For a current of 7 mA in the line comprising resistor 7002 and a current of 0.9 mA in the line comprising resistor 7001, it being known that the feedback of amplifier 2006 may add a current of 7 mA, the maximum output current from 2005 may be 15 mA.

The power dissipation in a rail-to-rail amplifier 2005 may be 15 mW.

From this information, we can estimate the power dissipation in amplifier 2004 as being 7 mW during saturated operation. The maximum power dissipation in amplifier 2004 may be 30 mW, the maximum power dissipation in amplifier 2005 may be 60 mW, and the maximum power dissipation in amplifier 2006 may be 30 mW.

FIG. 8 illustrates a voltage follower assembly that allows creating a control voltage for a component of variable impedance, described below. This assembly comprises a diode 801 for rectifying the control signal 55 and protecting the component of variable impedance. A diode of type 1N914 may be used for example.

Amplifier 2007 may advantageously differ from amplifiers 2001-2006 in that it is only supplied a voltage of +15V, the other terminal being connected to ground, to prevent supplying negative voltage to the component of variable impedance 81. An amplifier of type LT1006 may be used, for example. The positive terminal of amplifier 2007 may comprise a connection to ground via a resistor 8001. The maximum current in the diode 801 may be 0.2 mA, for a power dissipation of 0.12 mW. The power dissipation in resistor 8001 may be 4 mW, when the resistance value of this resistor is 100 kOhm. Amplifier 2007 may output a rectified voltage 56. This amplifier 2007 thus typically allows a small current to pass through the diode 801. In the absence of amplifier 2007, the dimensions of the diode 801 may play a role in the delivery of sufficient current to control the Darlington transistor.

The characteristics of the maximum power that is output from amplifier 2007 are dictated by the control requirements for the component of variable impedance 81 which diverts the excess charging current. The component of variable impedance 81 of FIG. 8, which may, for example, be a power transistor such as a Darlington transistor, may advantageously be provided to ensure the diverting of a current of at least 3 A. Considering a minimum gain of 100 for the Darlington transistor 81 of FIG. 8, the control current that is output from the inverting amplifier 2007 may be equal to 30 mA. As the high-state voltage is considered to be 13 V, the control resistance of the Darlington transistor may be approximately 400 Ohm. The maximum power dissipation in amplifier 2007 may then be 150 mW.

The Darlington transistor 81 of FIG. 8 may be connected to the line brought to the control voltage 56 via a resistor 8002. This control voltage can power the base of the first transistor of the Darlington variable impedance device. The emitter of the second transistor of the Darlington variable impedance device may be connected to the negative electrode 1, brought to potential 101, of the current cell. The collector common to the first and second transistor of the Darlington variable impedance device 81 may be connected to the negative electrode of the next cell of the battery.

The resistor 8002 may, for example, be chosen to be equal to 1 kOhm. The choice of value for this resistor allows adjusting the control voltage of the Darlington transistor. The response of the Darlington transistor can thus be adjusted by the choice of gain in the inverting amplifier of FIG. 6, with the aid of the potentiometer 6003, and also by the choice of resistor 8002.

The base of the Darlington transistor allows excess charging current to pass from the negative electrode of the current cell to the negative electrode of the next cell in the battery, when the voltage applied to the base is sufficient for the Darlington transistor to become conductive. In practice, the construction of the regulating circuit described above is such that the Darlington transistor becomes conductive when the potential of the negative electrode reaches the threshold potential 50, or at least draws close to it, without allowing the threshold value 50 to be exceeded. In this case, the current applied to the cell in question can take two distinct paths: a portion of the current can flow through the electrolyte between the two charging electrodes, and the remaining portion can travel through the Darlington transistor 81.

The current diverted from the cell by the Darlington transistor 81 may be such that only the portion of the current applied to the cell to maintain the potential of the negative electrode 1 at a value less than or equal to the threshold is allowed to pass through the electrolyte between the two charging electrodes. Thus, the Darlington transistor 81 acts as an analog component of variable impedance, this variation being controlled by the control voltage 56 supplied to the base of the Darlington transistor 81. As the response of the Darlington component 81 is generally exponential due to the high gain obtained in the conductive state, the passage of a current likely to increase the potential of the negative electrode 1 beyond the threshold value 50 is prevented. The control voltage 56 is based on the difference between the potential of the negative electrode 1 and the threshold value 50. This regulation can then be used to adapt the impedance of the Darlington transistor in a manner correlated to the difference between the potential 101 of the negative electrode 1.

The system for regulating the charging of a battery, described above, is able to offer a response time of a few hundred microseconds, particularly due to the response times of the operational amplifiers used, estimated at 40 microseconds. The Darlington component of variable impedance 81 typically has fast response dynamics, of ten nanoseconds or so. It allows diverting up to 5 A of current with only 5 mA of power supplied to the base of the first transistor.

Furthermore, the invention is not limited to the particular embodiments presented above by way of example.

For example, it is possible to divert excess charging current elsewhere than to a neighboring cell. The diverted charging current may, for example, be used to supply power to an energy storage device.

The invention may be implemented in a battery comprising a single metal-air cell, as well as in a battery comprising a plurality of metal-air cells which are electrically interconnected.

The choice of components (resistors, amplifiers) have been provided only as exemplary embodiments, to illustrate that the invention can regulate currents of high intensity with a fast response time while requiring little energy.

The invention claimed is:

1. A method for managing charge of a metal-air battery comprising at least one cell, the at least one cell comprising at least a negative electrode, a first positive air electrode, and a second positive oxygen-release electrode, the method comprising, for each cell, during application of a current to the at least one cell that results, during charging, in the flow of charging current between the negative electrode and the second positive oxygen-release electrode:
   comparing an absolute value of a potential of the negative electrode to a critical threshold value, the potential of the negative electrode being determined relative to the first positive air electrode;
   when the absolute value of the potential of the negative electrode reaches the critical threshold value, diverting an excess charging current that is a function of a difference between a current applied to the at least one cell and the charging current.

2. The method of claim 1, wherein the excess charging current of the at least one cell is diverted to a neighboring cell or to a charger.

3. The method of claim 1, wherein, for each cell, the critical threshold value is set based on the potential of the negative electrode when charging begins.

4. The method of claim 1, wherein the critical threshold value is re-evaluated at regular time intervals.

5. The method of claim 1, wherein an analog circuit comprising a component of variable impedance is provided, the diverting of excess charging current being implemented by modifying impedance of said component of variable impedance.

6. The method of claim 5, wherein the impedance of the component of variable impedance varies at least as a function of a quantity representative of a difference between the potential of the negative electrode and said critical threshold value, in order to deliver said excess charging current as output from the component of variable impedance.

7. The method of claim 1, wherein measurement of the potential of the negative electrode comprises voltage stabilization filtering between the negative electrode and the first air electrode.

8. A charge manager for a cell of a metal-air battery comprising at least one cell, the cell comprising at least a negative electrode, a first positive air electrode, and a second positive oxygen-release electrode, the charge manager comprising an electronic circuit for each cell, arranged so as to, during application of a current to the cell that results, during charging, in the flow of charging current between the negative electrode and the second positive oxygen-release electrode:
   comparing an absolute value of a potential of the negative electrode to a critical threshold value, the potential of the negative electrode being determined relative to the first positive air electrode;
   when the absolute value of the potential of the negative electrode reaches the threshold value, diverting an excess charging current that is a function of difference between current applied to the cell and the charging current.

9. The charge manager of claim 8, wherein the electronic circuit diverts the excess charging current to a neighboring cell or to a charger, via a respective connection to said neighboring cell or charger.

10. The charge manager of claim 8, wherein the electronic circuit comprises a component of variable impedance, the diverting of the excess charging current being implemented by changing the impedance of said component of variable impedance.

11. The charge manager of claim 10, wherein the component of variable impedance is a power transistor.

12. The charge manager of claim 11, wherein the power transistor is a Darlington transistor.

13. The charge manager of claim 9, further comprising an electronic circuit for measuring the difference in potential between the negative electrode and the first positive air electrode.

14. The charge manager of claim 13, wherein the electronic measurement circuit comprises a voltage stabilization filter.

15. A battery comprising at least one cell, the at least one cell comprising at least a negative electrode, a first positive air electrode, a second positive oxygen-release electrode, and the charge manager of claim 8.

* * * * *